United States Patent

[11] 3,614,217

[72] Inventor Leonard Bronstein
 7457 East Vista Drive, Scottsdale, Ariz.
 85253
[21] Appl. No. 840,424
[22] Filed July 9, 1969
[23] Division of Ser. No. 582,044, Sept. 26, 1966,
 Pat. No. 3,472,581.
[45] Patented Oct. 19, 1971
 The portion of the term of the patent
 subsequent to Oct. 14, 1986, has been
 disclaimed.

[54] FUSED CONCENTRIC TRIFOCAL CORNEAL
 CONTACT LENS
 1 Claim, 14 Drawing Figs.
[52] U.S. Cl. .................................................. 351/161,
 351/171
[51] Int. Cl. .................................................. G02c 7/04,
 G02c 7/06
[50] Field of Search .......................................... 351/161,
 171, 172

[56] References Cited
 UNITED STATES PATENTS
 1,734,428 11/1929 Haering .................... 351/171 X
 3,037,425 6/1962 De Carle .................... 351/161
 3,270,099 8/1966 Camp ........................ 351/161 X
 3,472,581 10/1969 Bronstein .................... 351/161

Primary Examiner—David H. Rubin
Attorney—Drummond & Phillips

ABSTRACT: Multifocal corneal contact lenses which may be fitted in relationship similar to single vision contact lenses, having anterior curve or curves based upon the necessary distance power desired; posterior curve or curves, as desired, to maintain proper relationships with the cornea; and interface curves, between the two fused-together materials of different refractive index necessary to provide the proper power effects for the various seeing positions; the far vision portion of said lenses being concentrically located in the central portion of the lens and the near vision portions being located in surrounding relation with the far vision portions and near the periphery of the lens, and the lens thus being annularly symmetrical to permit rotation of the lens on the cornea of the eye into various positions without changing the optical functions of the lens with relation to the eye.

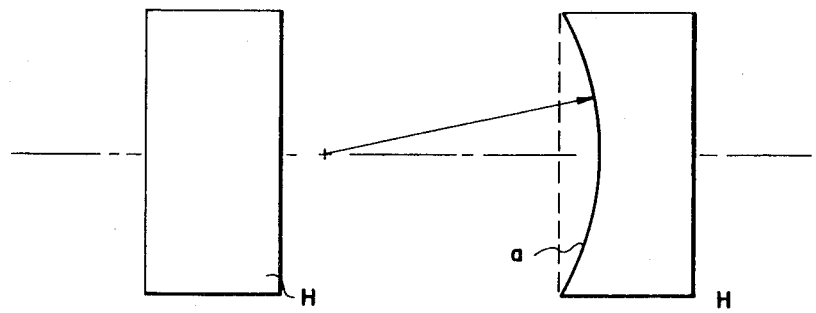
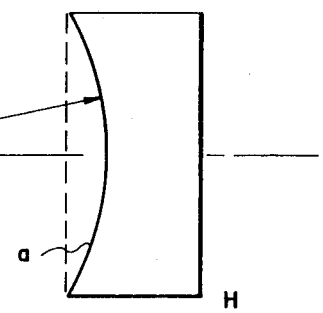
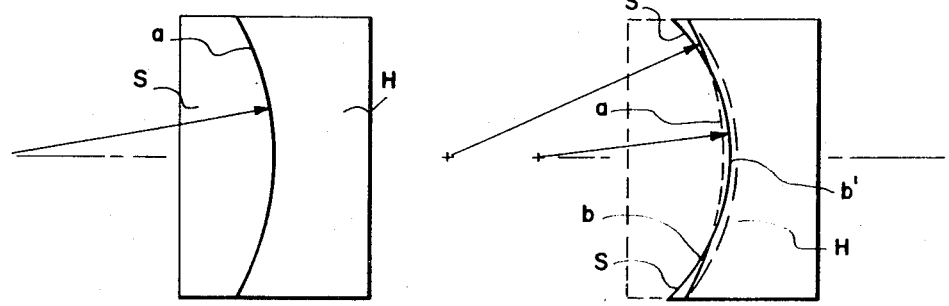
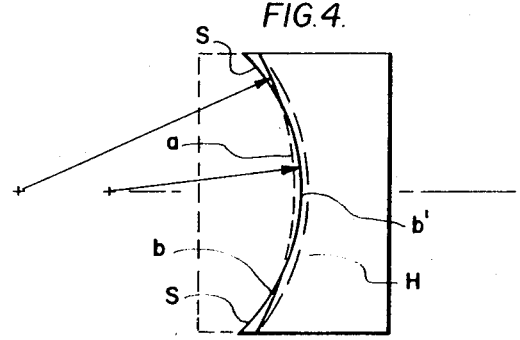
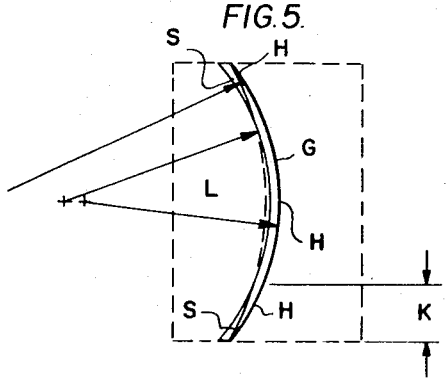
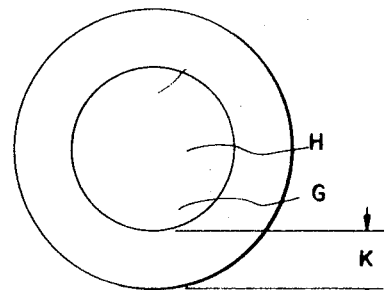
INVENTOR
LEONARD BRONSTEIN

INVENTOR.
LEONARD BRONSTEIN

FUSED CONCENTRIC TRIFOCAL CORNEAL CONTACT LENS

This application is a division of my prior filed application, Ser. No. 582,044, filed Sept. 26, 1966, which issued Oct. 14, 1969, as U.S. Pat. No. 3,472,581.

Prior art multifocal corneal contact lenses have employed materials of different refractive index fused together, however, these prior art lenses employ material of a low refractive index on the frontal portion of the lens and high refractive index material on the rearward portion of the lens, and consequently it is known that most prior art multifocal corneal contact lenses are quite thick and relatively undesirable because of such thickness.

Also prior art fused multifocal corneal contact lenses have used a radius of curvature at the interface curve between the materials of different refractive index steeper or of a shorter radius than the posterior base curve of the contact lens which rests in opposition to the eye, and consequently it is known that most prior art multifocals have extra thickness on the lens to compensate for the curvatures used.

Accordingly, it is an object of the present invention to provide a novel fused multifocal corneal contact lens which is quite thin, as compared to prior are fused multifocal corneal contact lenses.

Another object of the invention is to provide a multifocal corneal contact lens having an anterior portion of relatively high refractive index; a posterior portion of relatively lower refractive index; with the interface juncture curve or curves flatter than the posterior base curve of the lens; and the posterior base curve of the lens cut and polished to a depth or to a distance forwardly of the low-index material in the center of the lens over a desirable diameter, whereby the distance seeing portion of the lens will thus be located in the center of the lens in round form and consist of high index of refraction material only, and the near or intermediate seeing portion or portions of the lens will be immediately surrounding the distance seeing portion in annular form and consisting of a combination of high index of refraction material anterior to low index of refraction material.

Still another object of the invention is to provide a multifocal corneal contact lens having an anterior portion of relatively high refractive index; a posterior portion of relatively lower refractive index; with the interface juncture curve or curves flatter than the posterior base curve of the lens; and the posterior base curve of the lens cut and polished to a distance rearward of the interface curve; and the anterior curve of the lens cut and polished to a distance whereby it intersects the interface juncture curve at any desired diameter; whereby the near or intermediate seeing portions of the lens will be located in the center of the lens in round form and consist of high refractive index material anterior to low refractive index material, and the distance seeing portion of the lens will be immediately surrounding in annular form and consisting of low refractive index material.

Another object is to use a curve or curves at the interface juncture of the two media of different refractive index, which are flatter than the base curve on the posterior surface of the lens in order to minimize the thickness of the bifocal or trifocal (multifocal) segments.

Another object is to use a curve or curves at the interface juncture of the two media of different refractive index, which are flatter than the base curve on the posterior surface of the lens so that the resulting shape of the bifocal or trifocal will be annular form in order to provide near or intermediate vision above, as well as below the horizontal line of sight, when needed.

Another object of the invention is to provide a multifocal corneal contact lens in which the power of the peripheral portions of the lens are different by varying the curve or curves at the interface junction of two materials of different refractive index, thereby creating bifocals, trifocals, quadrifocals, or any variation of multifocals as may be desired.

Another object of the invention is to provide multifocal corneal contact lenses having an anterior portion of relatively high refractive index; a posterior portion of relative low refractive index; with the interface juncture having a curve or curves flatter than the posterior base curve of the lens; and the posterior base curve of the lens decentered and then cut and polished to a depth or position forwardly of the interface junction of the materials, so as to eliminate the low-index material at the top of the lens to any desired height, whereby the distance seeing portion of the lens will thus be located at the top of the lens and consist of a high index of refraction material, and the other seeing portion or portions of the lens will be at the bottom of the lens in crescent form consisting of a combination of high index of refraction material anterior to low index of refraction material, with the thickest portion of the lens being at the bottom automatically to control gravitation orientation of the lens.

Another object of the invention is to provide a multifocal corneal contact lens having various combinations of powers at various positions on the lens due to the provision of different spherical or toric powers on either the posterior or anterior surface of the lens in combination with the optical powers at the interface junction of the high and low index of refraction material of the lens.

Another object of the invention is to provide a multifocal corneal contact lens having a lenticular flange for the purpose of reducing center thickness on plus powered lenses or reducing edge thickness on minus powered lenses, or varying the weight distribution of any powered lens to aid in orientation.

Another object is to provide fused multifocal corneal contact lenses in other than round form on the periphery for purposes of orientation.

With these and other objects in view, my invention consists in the construction, arrangement and combination of the various parts of my fused multifocal corneal contact lenses, whereby the above-contemplated objects are attained, as hereinafter more fully set forth, pointed out in my claims, and illustrated in detail on the accompanying drawings, wherein:

FIG. 1 is a vertical sectional view of a material of high refractive index;

FIG. 2 is a vertical sectional view of the material shown in FIG. 1, and having a spherical recess cut in one surface to form the curve of an interface junction;

FIG. 3 is a vertical sectional view of the high index of refraction of material, shown in FIG. 2, together with a lower refractive index material fused on the interface junction surface of the high refractive index material;

FIG. 4 is a vertical sectional view similar to that shown in FIG. 3, wherein a posterior base curved recess is formed in the material having a low refractive index, the base curve extending forwardly of the interface junction so as to eliminate the lower refractive index material form the center of the structure;

FIG. 5 is a vertical sectional view of the structure, shown in FIG. 4, and having an anterior generally spheroid surface formed of the higher refractive index material in order to provide for the necessary optical power for distance seeing at the center of a multifocal corneal contact lens, in accordance with the present invention;

FIG. 6 is an elevational view of the lens, shown in FIG. 5, and illustrating the annular appearance of the fused bifocal corneal contact lens of the invention;

Figure 7:
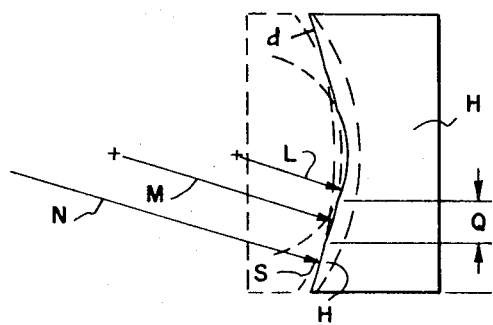
Figure 8:
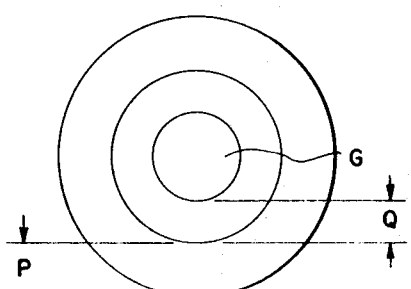
Figure 9:
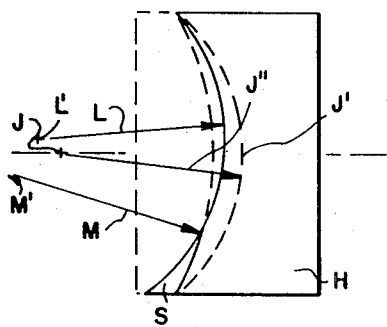
Figure 10:
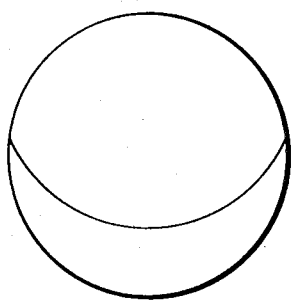
Figure 11:
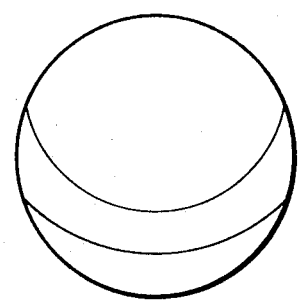
Figure 12:
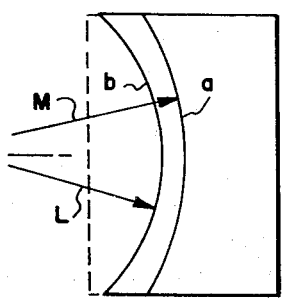
Figure 13:
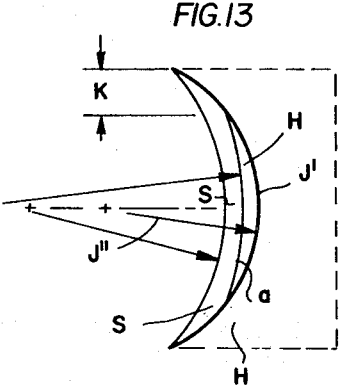
Figure 14:
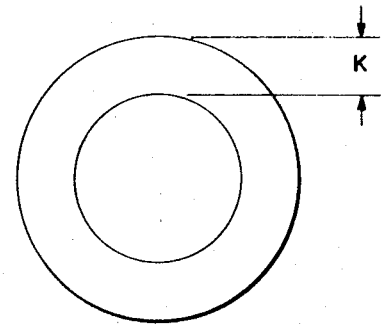

FIG. 7 is a vertical sectional view similar to that shown in FIG. 2, but showing two spherical surfaces of different radii cut on the posterior surface of the high refractive index material ultimately to form a trifocal lens, the curves being such that each curve is flatter than the next most central curve, thereby indicating the possibilities of producing quadrifocals, quintifocals or any kind or number of multifocal lens;

FIG. 8 is an elevational view showing the concentric annular appearance of the various curves of the structure, shown in FIG. 7;

FIG. 9 is a vertical sectional view similar to that shown in FIG. 3, wherein the base curve or spherical recess of the lens is disposed on an eccentric axis and cut to a depth or position forwardly of the interface junction of the high and low refractive index materials, such as to eliminate the lower refractive index material from the top portion of the lens to form a crescent-shaped bifocal having an eccentric center of gravity, such that the lens will automatically afford gravitational orientation when worn on the cornea of the human eye;

FIG. 10 is an elevational view of the structure shown in FIG. 9, after the anterior curve has been cut to form the complete unedged lens, showing the crescent shape of the bifocal arrangement of such a lens;

FIG. 11 is an elevational view showing two curves provided at the interface junction, such as shown in FIG. 7, with the lens of eccentric center of gravity, as illustrated in FIG. 9, to form a trifocal in crescent shape and to provide automatic gravitational orientation of the lens;

FIG. 12 is a sectional view of a modification, and illustrates the center of a base curve of a lens formed rearward relative to the interface juncture in accordance with the invention;

FIG. 13 is a view similar to FIG. 12, showing the anterior surface of the lens intersecting the interface juncture of the two materials; and FIG. 14 is an elevational view of the modified lens, shown in FIG. 13.

In accordance with the present invention, it is possible to produce the following lenses: Annular fused bifocal corneal contact lenses, annular fused trifocal corneal contact lenses, annular fused multifocal corneal contact lenses, crescent-shaped fused bifocal corneal contact lenses, crescent-shaped fused trifocal corneal contact lenses, and crescent-shaped fused multifocal corneal contact lenses.

With reference to the accompanying drawings, the character H is used generally to indicate the blank piece of material made of suitable plastic material of relatively high refractive index, such as copolymer of a polyester, methylmethacrylate and styrene. The portion H has a posterior interface junction curve or curves $a$, $d$ cut and polished on the surface to form the bifocal, trifocal, or multifocal segments, as desired, and as will be hereinafter described in detail. The radii of curvature used at this interface junction surface will be that curve or curves flatter than a base curve $b$ of the lens and which is required to achieve the necessary power in the different areas of the lens. The curves $a$, $d$ are also of such radii of curvature that the bifocal, trifocal, or multifocal segments S will be relatively thin so that normal overall lens thicknesses needed for proper fitting techniques can be maintained. The radius of the interface junction curve or curves ranges from 7.30 mm. to 14.00 mm.

The portion S consists of a suitable plastic material, such as methylmethacrylate and is fused, cemented or otherwise bonded together with optical clarity to the material H by polymerizing a monomer of the material onto the surface of the material H. The material S is a suitable plastic material, which is of lower refractive index than the material H.

Other resins having the necessary optical properties may be used in place of the ones mentioned provided that the material H has the higher refractive index and the material S, the lower refractive index.

The base curve $b$ is cut on the posterior surface of the material S and to a depth or a position intersecting the interface junction of the materials S and H, such that the center portion of the material S is cut away, leaving only the material H in the center and a combination of the materials H and S immediately surrounding the central portion to form an annular-type bifocal, trifocal or multifocal lens, as generally indicated in FIGS. 5, 6, 7 and 8.

The base curve $b$ may be decentered so as to cut out the top portion of the material S, leaving a crescent-shaped bifocal, trifocal or multifocal, as generally indicated in FIGS. 9, 10 and 11.

The decentering of the base curve $b$ allows the bottom edge of the lens to remain thicker than the top edge to provide gravitational orientation of the lens, this being an automatic function when worn on the cornea of the human eye, since the center of gravity of the lens will then operate in a pendulum-like manner.

In those particular instances where different powers are desirable at different points on the lens, many other variations may be made, such as cutting different spherical radii of curvature on the anterior surface G to provide different power effects; cutting various spherical radii of curvature on the posterior surface $b$ to provide different power effects; cutting toric radii of curvature on the anterior surface G or posterior surface $b$ or both surfaces for the correction of residual astigmatism. Additionally, the automatic gravitational orientation of the lens may be controlled by the aforementioned eccentric weighted lens, and further, prism or lenticular flanges or truncations or peripheral shapes other than round may also be formed in accordance with the invention.

Referring specifically to the drawings, it will be seen that the blank, shown in FIG. 1, is a piece of material having a high index of refraction and that the spherical recess $a$ is cut to form an interface junction for the relatively low index of refraction material S, which is fused to the material H at the interface junction curve $a$.

As shown in FIG. 4, the base curve $b$ is cut to fit the cornea of the human eye and a central portion $b'$ is cut forwardly of the interface junction curve $a$ completely to eliminate the material S at the central portion $b'$ and to leave only the material H, whereupon an anterior curve or spherical surface G is formed, to complete the lens, all as shown in FIGS. 5 and 6 of the drawings.

In the area of the lens, as shown in FIGS. 5 and 6, and particularly that area designated K between the central portion and perimeter of the lens, both materials H and S are present, thus, providing high index of refraction material on the forward side of such portion K and low index of refraction material S on the rearward portion providing a bifocal annular section surrounding the central portion of high index refractive material H, generally designated at G in FIGS. 5 and 6 of the drawings.

As shown in FIGS. 7, a block of material H is provided with a spherical recess formed on a radius M to form an interface juncture curve; a secondary interface juncture curve formed on a radius N is provided to intersect the curve on the radius M in order to provide a trifocal lens having concentric portions, as indicated in FIG. 8. The curves $a$ and $d$ correspond with the radius N, at the perimeter of the lens, and the radius M immediately inward thereof. A radius L forms the base curve extending forward of the interface junction curve and into the high index of refraction material H. Thus, the central portion G of the lens, shown in FIG. 8, is similar to that disclosed in FIGS. 5 and 6. An annular section between the central portion and the portion designated Q, and an outermost annular portion designated P, includes a combination of the materials H and S. Thus, a trifocal lens is formed, in accordance with the invention. As will be apparent to those skilled in the art, the curvature of the curve L of FIG. 7 is exaggerated for clarity of illustration.

As shown in FIG. 9 of the drawings, the material H is cut away on a base curve radius L forwardly of the surface provided by the interface juncture radius M in the upper portion of the lens. However, the radius point L' is eccentric relative to the radius point M', and the anterior surface of the lens may be cut in accordance with a broken line J' formed about a center J of the anterior surface radius J''. The eccentric relationship of the various radii provide a lens having a thin upper edge and a relative thick lower edge, such that a change in shape of the multifocal portion is provided and the center of gravity of the lens affords automatic gravitational orientation of the lens, when worn on the cornea of the human eye.

FIG. 10 represents a frontal elevational view of the lens, indicated generally in FIG. 9, while FIG. 11 indicates the appearance of a lens formed in combination with the curve N, shown in FIG. 7, and the other curve M shown in FIG. 9. The base curve on radius L is located eccentrically relative to curves M and N to provide a trifocal having desirable shape and automatic gravitational orientation characteristics.

In the modification, as shown in FIG. 12 of the drawings, the base curve $b$, formed on the radius L, is rearward relative to the interface junction, curve $a$ formed on the radius M. As shown in FIG. 13, the convex anterior curved surface J' is formed on the radius J'' forwardly relative to the interface junction $a$ in the central area of the lens where both materials H and S are disposed. In the outermost area K of the lens, only the low index of refraction material S is disposed. Accordingly, the distance seeing portion of the lens is in the area K and the bifocal portion of the lens is in the central area, the diameter of this central area of the lens may be such that distance seeing in the area K may be accomplished with facility.

It will be obvious to those skilled in the art that various modifications of the present invention may be resorted to in the manner limited only by a just interpretation of the following claims.

I claim:

1. A trifocal contact lens to be worn on the cornea of a human eye comprising: a lens body of circular configuration; said lens body being formed of first plastic material of a high index of refraction on the frontal portion thereof for far point vision and second plastic material of a low index of refraction fused on the rearward portion of said first material for near point vision and intermediate vision; said lens having an anterior convex surface and a posterior concave surface; a posterior portion of said first material having two generally concave curvatures; the more central concave curve of said two concave curvatures related to intermediate vision and shorter in radius than a more peripheral concave curve of said two generally concave curvatures; said more peripheral concave curve being related to near point vision; and an anterior portion of said second material conforming with said posterior portion of said first material to form two interface junctions having radii of curvature ranging from 7.30 mm. to 14.00 mm., said posterior curved surface related to the cornea of the eye for proper fitting purposes, said two interface junctions being positioned with respect to said posterior curved surface, to insure the presence of an intermediate zone in the final lens, the radius of curvature of said posterior curved surface being shorter than that of said interface junctions and extending through the center of said interface junctions leaving a circular area of only high-index material near the center of the lens to provide the proper power for said far point or distance vision and leaving said high-index material in front of said low-index material toward the periphery of the lens so that said low-index material forms an annular area completely surrounding said far point area and the central portion of the lens, whereby the lens is thus symmetrical and concentric with respect to the central far point vision area and the surrounding intermediate and near point vision areas so that the lens may be rotated to various positions on the cornea of the eye without changing the optical cooperation with the eye in either the far point vision, intermediate vision or near point vision functions.